June 19, 1923.
A. E. SHEA
1,459,346
SHIM PLATE FOR DEMOUNTABLE RIMS
Filed June 13, 1922
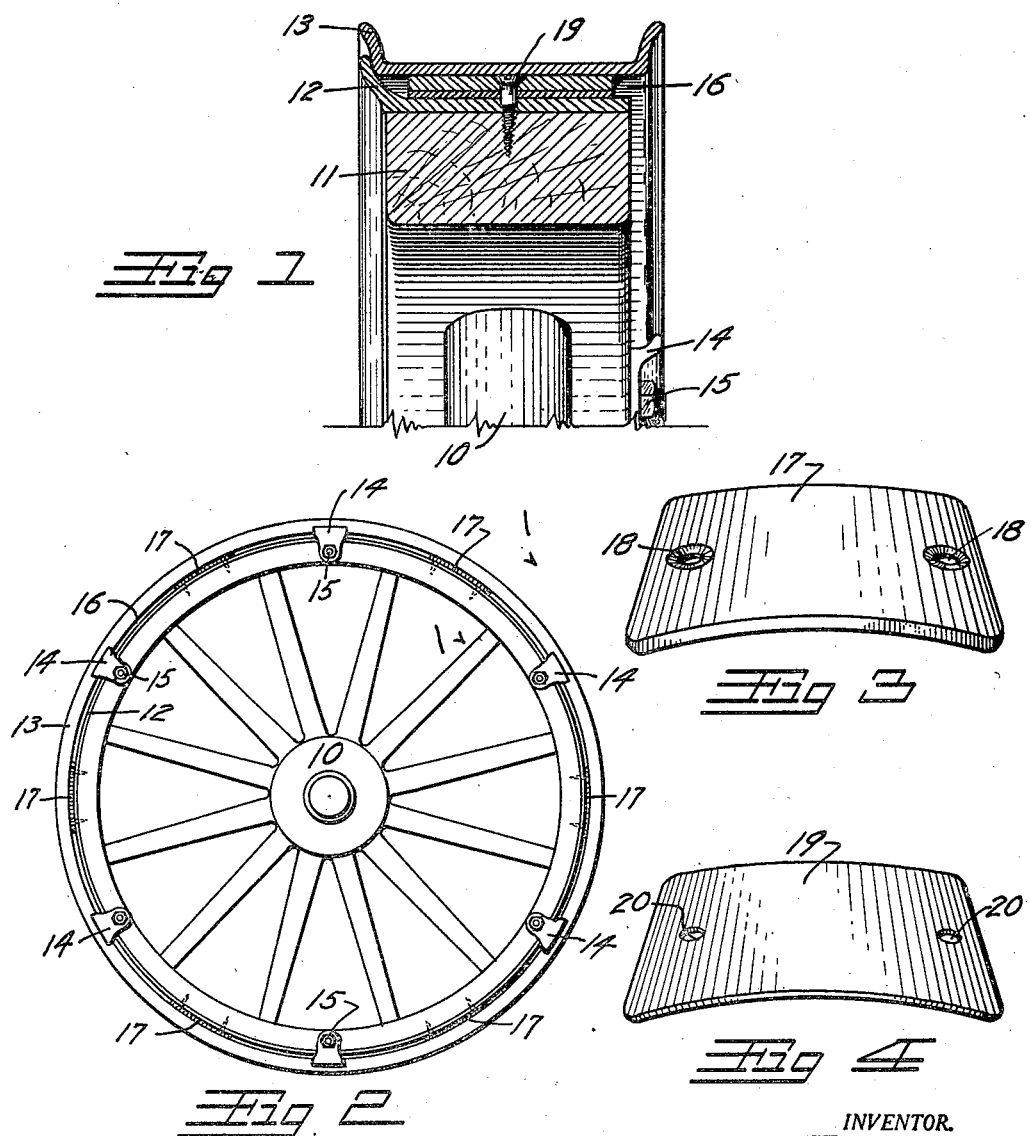
INVENTOR.
ARTHUR E. SHEA
BY
ATTORNEY.

Patented June 19, 1923.

1,459,346

UNITED STATES PATENT OFFICE.

ARTHUR E. SHEA, OF ECKLEY, COLORADO.

SHIM PLATE FOR DEMOUNTABLE RIMS.

Application filed June 13, 1922. Serial No. 567,984.

*To all whom it may concern:*

Be it known that I, ARTHUR E. SHEA, a citizen of the United States, and a resident of Eckley, in the county of Yuma and State of Colorado, have invented certain new and useful Improvements in Shim Plates for Demountable Rims, of which the following is a clear, full, and exact description, such as will enable others skilled in the art to which it appertains to make and use the same.

This invention relates to a device adapted to be used in connection with certain makes of demountable rims at present on the market and has for its principal object the provision of a device of this character which will keep the demountable rim true and prevent its becoming loosened.

In certain makes of demountable rims there is no support for the demountable rim between the points of contact of the rim lugs. This allows the rim to flex inward when the weight is applied between lugs, forcing the demountable rim in the shape of an approximate oval. When the weight of the car passes to a point over a lug the rim resumes its circular shape. This constant flexing of the rim soon causes it to become loose and makes it impossible to keep rims of this character tight. In the use of this device the rim is provided with a broad supporting surface at points between the lugs and the rim is thereby prevented from being forced inward.

A further object and advantage of the invention resides in the fact that with its use the demountable rim will always be concentric with the wheel proper. In certain types of demountable rims, if the rim lug nuts at one side of the wheel are tightened more than those of the opposite side, the rim will be thrown eccentric to the wheel which results in the loosening of the rim lugs, causes vibration and wear on the tires and in some cases which have come to the inventor's knowledge have made it almost impossible to keep tires on the wheel. With the use of this invention the rim is always held in concentric relation to the wheel whereby the above noted disadvantages are removed.

Further objects and advantages reside in its simplicity and low cost of manufacture and in the fact that it can be readily attached to wheels now in use without the necessity of changing the present equipment in any way.

The invention will now be described in detail, reference being had to the accompanying drawing which forms a part hereof. Like numerals refer to like parts throughout the following description and in all views of the drawing.

In the drawing:

Fig. 1 is a cross section, taken on the line 1—1, Fig. 2, through the felloe and rim of an automobile wheel.

Fig. 2 is a side elevation of an automobile wheel with the invention applied.

Fig. 3 is perspective view of one of the type of plates used in my invention.

Fig. 4 is a perspective view of another type of plate used in the invention.

Let the numeral 10 designate an automobile wheel, upon the felloe 11 of which is mounted one of the usual types of demountable rim retainers 12 adapted to hold one of the usual type of demountable rims 13. Rim 13 is held in place on the rim retainer 12 by rim lugs 14 and nuts 15 in the usual way.

It will be seen that, as usually applied there is an open space 16 between the rim 13 and the retainer 12 entirely around the wheel, the rim, 13, being supported at its inner edge by the wedge action of the retainer 12, and at its outer edge by and at the rim lugs 14. This open space 16 allows the weight on the wheel to force the rim 13 toward the rim retainer 12, causing the rim to be distorted by being forced along the wedge shaped edge of the retainer 12. This constant and repeated distortion soon results in loosening the rim 13 and rim lugs 14.

To prevent this distortion and loosening relatively thick, arcuate plates or shims 17 are placed in the space 16 at point intermediate to the lugs 14. Plates 17 are each provided with two countersunk holes 18 through which screws 19 pass. In installing the plates 17, holes registering with the holes 18, are drilled through the rim retainer 12. The screws 19 are then screwed into the wood of the felloe 11.

Plates 17 are made of sufficient thickness to fit snugly into the minimum space 16 as is usually found. Should the space have become enlarged, however, through some cause or other, the space is filled to cause the plate 17 to fit snugly against the rim, by means of a sufficient number of thin, arcuate shims 19 provided with holes 20 adapted to receive the screws 19.

In Fig. 1 one of the thin shims 19 is shown in place. Shims 19 should be equally distributed with the plates 17 around the wheel so that the rim 13 will be held concentric with the wheel 10.

While I have described and illustrated herein a specific form of my invention I wish it understood that the same may be varied, within the scope of the appended claim, without departing from the spirit thereof.

Having thus described the invention, what is claimed and desired secured by Letters Patent is:

The combination of a wheel felloe; a demountable tire containing rim slidably mounted on said felloe; bolts equally spaced in the side of said felloe; a clip on each of said bolts adapted to hold said rim on said felloe and shim plates detachably secured to said felloe between said felloe and said rim, said shim plates being spaced between each pair of said bolts and being adjustable in thickness so that they may be made to completely close the space between said felloe and said rim.

In testimony whereof I affix my signature.

ARTHUR E. SHEA.